(12) United States Patent
Hashimoto et al.

(10) Patent No.: US 12,230,415 B2
(45) Date of Patent: Feb. 18, 2025

(54) ELECTRODE STRUCTURE

(71) Applicant: Meijo Nano Carbon Co., LTD, Nagoya (JP)

(72) Inventors: Takeshi Hashimoto, Nagoya (JP); Takumi Yana, Nagoya (JP)

(73) Assignee: Meijo Nano Carbon Co., Ltd., Nagoya (JP)

( * ) Notice: Subject to any disclaimer, the term of this patent is extended or adjusted under 35 U.S.C. 154(b) by 116 days.

(21) Appl. No.: 17/812,564

(22) Filed: Jul. 14, 2022

(65) Prior Publication Data

US 2023/0041736 A1  Feb. 9, 2023

Related U.S. Application Data

(63) Continuation of application No. 16/302,194, filed as application No. PCT/JP2017/018076 on May 12, 2017, now abandoned.

(30) Foreign Application Priority Data

May 17, 2016  (JP) .................................. 2016-098926

(51) Int. Cl.
*H01B 1/04* (2006.01)
*H01G 11/24* (2013.01)
(Continued)

(52) U.S. Cl.
CPC .............. *H01B 1/04* (2013.01); *H01G 11/24* (2013.01); *H01G 11/36* (2013.01); *H01G 11/42* (2013.01);
(Continued)

(58) Field of Classification Search
None
See application file for complete search history.

(56) References Cited

U.S. PATENT DOCUMENTS 6,528,211 B1 * 3/2003 Nishimura ............. B82Y 30/00
429/231.1
9,337,474 B1  5/2016 Fischel
(Continued)

FOREIGN PATENT DOCUMENTS

CN  103972483  8/2014
JP  2003257797 A  9/2003
(Continued)

OTHER PUBLICATIONS

The Applicant respectfully notes that the present U.S. Appl. No. 17/812,564, filed Jul. 14, 2022, is a continuation of U.S. Appl. No. 16/302,194, filed Nov. 16, 2018, which is a 35 U.S.C. § 371 national-stage filing of International Patent Application Serial No. PCT/JP2017/018076, filed May 12, 2017, which claims the benefit of priority to Japanese patent application Serial No. 2016-098926, filed May 17, 2016.
(Continued)

*Primary Examiner* — Lisa S Park
(74) *Attorney, Agent, or Firm* — Gerald W. Roberts; John V. Daniluck; Dentons Bingham Greenebaum LLP

(57) ABSTRACT

The electrode structure for electronic devices according to the present invention comprises a powdered electrode material, and carbon nanotubes having a volume resistivity of not more than $2\times10^{-2}$ Ω·cm.

12 Claims, 3 Drawing Sheets

(51) Int. Cl.

| | | |
|---|---|---|
| *H01G 11/36* | (2013.01) | |
| *H01G 11/42* | (2013.01) | |
| *H01G 11/86* | (2013.01) | |
| *H01M 4/02* | (2006.01) | |
| *H01M 4/133* | (2010.01) | |
| *H01M 4/62* | (2006.01) | |
| *H01M 4/86* | (2006.01) | |
| *H01M 4/90* | (2006.01) | |
| *H01M 4/96* | (2006.01) | |
| *H01M 8/10* | (2016.01) | |
| *H01M 10/0525* | (2010.01) | |
| *H01M 4/13* | (2010.01) | |

(52) U.S. Cl.
CPC .............. *H01G 11/86* (2013.01); *H01M 4/02* (2013.01); *H01M 4/133* (2013.01); *H01M 4/62* (2013.01); *H01M 4/621* (2013.01); *H01M 4/625* (2013.01); *H01M 4/86* (2013.01); *H01M 4/9083* (2013.01); *H01M 4/96* (2013.01); *H01M 8/10* (2013.01); *H01M 10/0525* (2013.01); *H01M 4/13* (2013.01); *H01M 2008/1095* (2013.01); *Y02E 60/13* (2013.01)

(56) References Cited

U.S. PATENT DOCUMENTS

| | | | |
|---|---|---|---|
| 2004/0197638 A1 | 10/2004 | McElrath | |
| 2006/0216596 A1 | 9/2006 | Cheiky | |
| 2008/0254974 A1 | 10/2008 | Nakano | |
| 2010/0282496 A1* | 11/2010 | Landi ................ | H01M 10/0525 428/323 |
| 2012/0141919 A1 | 6/2012 | Lee | |
| 2012/0315539 A1* | 12/2012 | Lashmore ................ | H01B 1/04 264/105 |
| 2013/0214210 A1* | 8/2013 | Hondo ..................... | B05D 5/12 252/502 |
| 2014/0087255 A1* | 3/2014 | Kim .......................... | D01F 1/08 429/219 |
| 2014/0212762 A1 | 7/2014 | Nakamura et al. | |
| 2015/0270575 A1 | 9/2015 | Nishie et al. | |
| 2016/0344038 A1 | 11/2016 | Kaneko | |
| 2017/0012291 A1 | 1/2017 | Tanimura | |
| 2017/0077486 A1* | 3/2017 | Ishii .................. | H01M 10/0525 |
| 2018/0108919 A1 | 4/2018 | Lu | |

FOREIGN PATENT DOCUMENTS

| | | | |
|---|---|---|---|
| JP | 2005294109 A | | 10/2005 |
| JP | 2006092760 A | | 4/2006 |
| JP | 2011076948 A | | 4/2011 |
| JP | 2011148674 A | | 8/2011 |
| JP | 2013062236 A | | 4/2013 |
| JP | 2015167127 | * | 9/2015 |

OTHER PUBLICATIONS

Further, the Applicant respectfully submits that any requisite copies of the references cited herein that have not been provided herewith should be available from the respective files of the foregoing related applications.
CN 201780030466.8, Office Action, 6 pages Dec. 3, 2020.
Japanese Patent Office, JP Appln. 2018-518269, Notice of Reasons for Refusal (with English translation), 7 pgs, May 7, 2021.
Chinese Patent Appln. 201780030466.8, Office Action issued by China Patent Office (SIPO), 12 pgs., Jul. 12, 2021.
Japanese Patent Appln. 2018-518269, Decision of Rejection issued by Japanese Patent Office, 6 pgs., Aug. 12, 2021.
Chinese Patent Appln. 201780030466.8, Decision of Rejection, China Patent Office (SIPO), 9 pgs. total (including English language translation), Jan. 6, 2022.
USPTO, Office Action, U.S. Appl. No. 16/302,194, 8 pgs., filed Dec. 13, 2019.
USPTO, Final Rejection, U.S. Appl. No. 16/302,194, 9 pgs., filed Sep. 4, 2020.
USPTO, Office Action, U.S. Appl. No. 16/302,194, 8 pgs, filed Mar. 2, 2021.
USPTO, Final Rejection, U.S. Appl. No. 16/302,194, 8 pgs, filed Sep. 14, 2021.
USPTO, Office Action, U.S. Appl. No. 16/302,194, 8 pgs, filed Mar. 15, 2022.
Castrucci et al. Appl. Phys. Lett. 85, 3857, 2004.

* cited by examiner 10.0μm

ELECTRODE STRUCTURE

CROSS-REFERENCE TO RELATED APPLICATION(S)

This application is a continuation of U.S. patent application Ser. No. 16/302,194, filed Nov. 16, 2018, which is a 35 U.S.C. § 371 national-stage filing of International Patent Application Serial No. PCT/JP2017/018076, filed May 12, 2017, which claims the benefit of priority to Japanese patent application Serial No. 2016-098926, filed May 17, 2016, all of which are incorporated herein by reference.

TECHNICAL FIELD

The present invention relates to an electrode structure that is used in electronic devices.

BACKGROUND ART

Storage devices, e.g., capacitors and lithium ion secondary batteries, nickel hydride batteries, and other secondary batteries, have in recent years been preferentially used as vehicle-mounted power sources, power sources for personal computers, and power sources for mobile devices. In addition, power-generating devices such as fuel cells and solar cells are becoming increasingly important as supply sources for clean electrical energy. The electrode structures used in these electronic devices are generally fabricated by preparing a slurry of a binder and a solvent mixed with a powdered electrode material adapted to the particular objectives, and coating this slurry on a sheet-shaped or foil current collector. Resin binders, e.g., polyvinylidene fluoride (PVDF), polyacrylonitrile (PAN), polytetrafluoroethylene (PTFE), styrene-butadiene copolymer (SBR), and so forth, have been widely used as the binder here. Patent Literature 1 is provided as a document that discloses this type of prior art.

CITATION LIST

Patent Literature

Patent Literature 1: Japanese Patent Application Laid Open No. 3006-092760.

SUMMARY OF THE INVENTION

Technical Problem

However, the resin binder present in the electrode structure acts as a resistive component and as a consequence can cause an increase in the resistance of the electrode. It would be useful if an art could be provided that does not use a binder resin and could thereby realize a low-resistance electrode structure. In addition, smaller sizes and thinner dimensions have been required in recent years of lithium ion secondary batteries and other electronic devices as part of efforts to increase performance. As a consequence, thin-film electrode structures suitable for size reduction and thickness reduction are required.

The present invention was achieved considering these points, and a primary object of the present invention is to provide, with regard to an electrode structure for use in lithium ion secondary batteries and other electronic devices, a thin-film electrode structure that exhibits a low resistance and an excellent film strength.

Solution to Problem

As a result of intensive investigations directed to solving the aforementioned problem, the present inventors discovered that a thin-film electrode structure for electronic devices, wherein the thin-film electrode structure has a low resistance and an excellent film strength, can be realized by mixing carbon nanotubes having a volume resistivity of not more than $2\times10^{-2}$ Ω·cm into an electrode material to have the former function as a binder and an electroconductive material. The present invention was achieved based on this discovery.

Thus, the electrode provided by the present invention is an electrode structure used in electronic devices. This electrode structure contains a powdered electrode material, and carbon nanotubes (also indicated in the following by "CNTs") having a volume resistivity of not more than $2\times10^{-2}$ Ω·cm.

A thin-film electrode structure for electronic devices, wherein the thin-film electrode structure has a low resistance and an excellent film strength, can be realized by using a mixture of an electrode material with CNT having the prescribed volume resistivity as indicated above.

In a preferred aspect of the herein disclosed electrode structure, the G/D ratio of the carbon nanotubes, as measured by Raman spectroscopic analysis, is at least 50 (and preferably at least 70). CNT having this G/D ratio can effectively contribute to enhancing the film strength.

In a preferred aspect of the herein disclosed electrode structure, the content of the aforementioned carbon nanotubes is not more than 10 mass %. The use in this content range of CNT having the indicated volume resistivity enables an even better realization of a thin-film electrode structure adapted for size reduction and thickness reduction.

A resin binder is not incorporated in a preferred aspect of the herein disclosed electronic device electrode. This electrode can extinguish the following disadvantages because it does not contain a resin binder: the inability to obtain satisfactory characteristics due to the large electrode resistance caused by the resin binder; the limitation imposed by the presence of the resin binder on increasing the content of the electrode material.

A current collector is not incorporated in a preferred aspect of the herein disclosed electrode structure. When this is done, the electrode structure can be simplified and a thin-film electrode structure can be realized that is adapted for additional size reduction and weight reduction. In addition, the following disadvantages can be extinguished by not incorporating a current collector in the electrode structure: the inability to obtain satisfactory characteristics due to the large electrode resistance caused by the interfacial resistance between the current collector and the electrode material (typically contact resistance); the increase in production costs caused by the slurry viscosity control and temperature/humidity control that can be required when the electrode material is coated on the current collector.

In a preferred aspect of the herein disclosed electrode structure, the average aspect ratio of the carbon nanotubes is at least 100 (preferably at least 500 and more preferably at least 800). By using CNT having such an average aspect ratio, a higher degree of resistance reduction can be realized at the same time that a greater improvement in the film strength can be realized.

In a preferred aspect of the herein disclosed electrode structure, the carbon nanotubes are single-walled carbon nanotubes. Single-walled CNTs exhibit stronger intermolecular forces than multi-walled CNTs and due to this are advantageous as a CNT adapted to the objects of the present invention.

In a preferred aspect of the herein disclosed electrode structure, the electronic device is a lithium ion secondary battery, and the electrode structure contains an active material as the electrode material. This constitution enables the realization of an electrode structure for lithium ion secondary batteries, wherein the electrode structure exhibits a higher performance, a better reduction in resistance, and a better film strength than heretofore.

In a preferred aspect of the herein disclosed electrode structure, the electronic device is an electric double-layer capacitor (this can include electrodes for asymmetric hybrid capacitors), and the electrode structure contains active carbon as the electrode material. This constitution enables the realization of an electrode for electric double-layer capacitors, wherein the electrode exhibits a higher performance, a better reduction in resistance, and a better film strength than heretofore.

In a preferred aspect of the herein disclosed electrode structure, the electronic device is a polymer electrolyte fuel cell, and the electrode structure contains a catalyst-supporting carbon as the electrode material. This constitution enables the realization of an electrode for polymer electrolyte fuel cells, wherein the electrode exhibits a higher performance, a better reduction in resistance, and a better film strength than heretofore.

DESCRIPTION OF EMBODIMENTS

Figure 1:
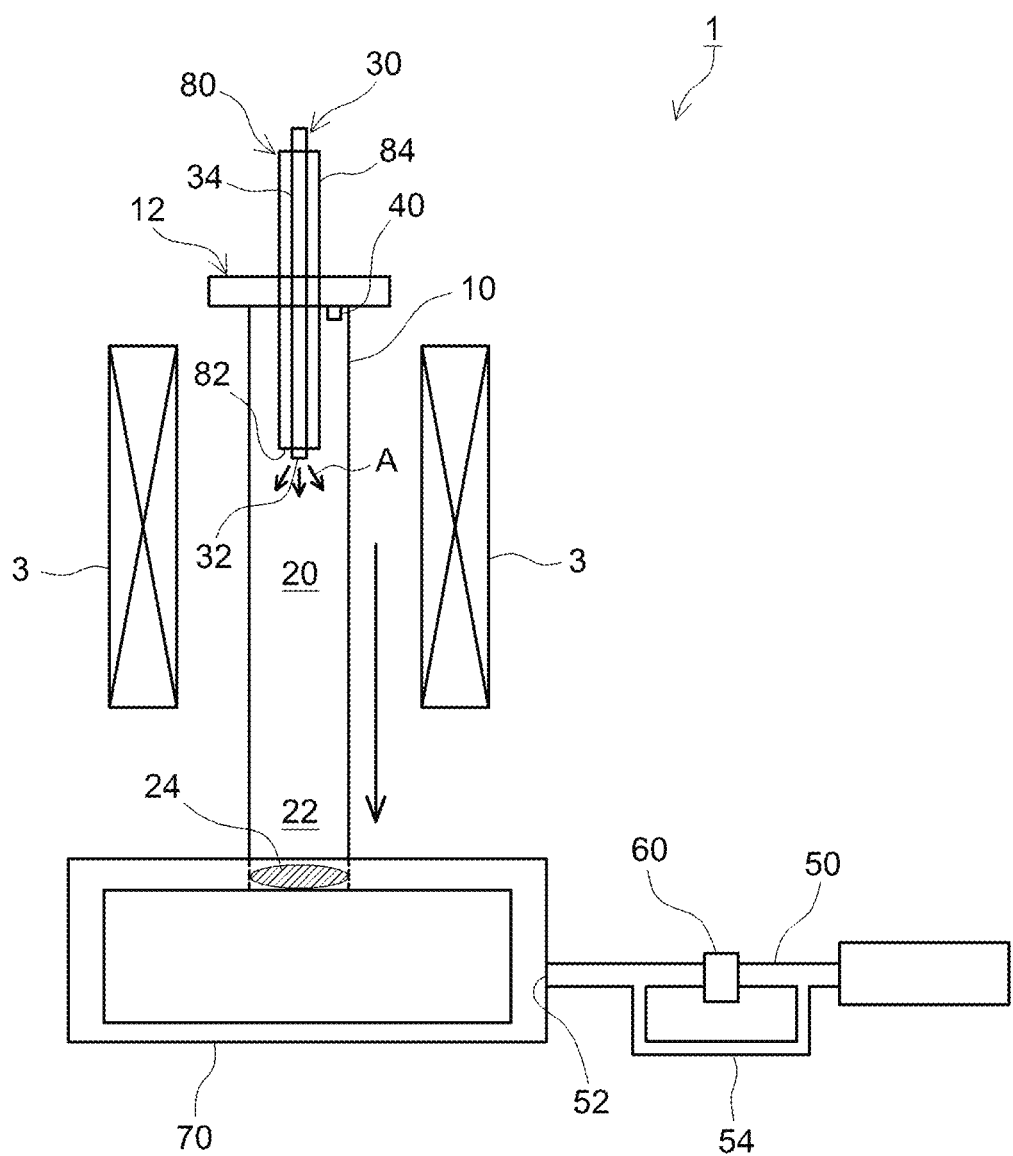
FIG. 1 is a diagram that schematically illustrates a flowing gas-phase CVD apparatus according to an embodiment of the present invention.

Preferred embodiments of the present invention are described herebelow. Matters required for the execution of the present invention but not particularly described in this Description can be understood as design matters for the individual skilled in the art based on the conventional art in the pertinent field. The present invention can be implemented based on the contents disclosed in this Description and the drawings and the common general technical knowledge in the pertinent field.

The herein disclosed electrode structure is an electrode structure for use in electronic devices, e.g., lithium ion secondary batteries, electric double-layer capacitors, fuel cells, and so forth, and contains a powdered electrode material, and carbon nanotubes (CNTs) having a volume resistivity of not more than $2 \times 10^{-2}$ $\Omega \cdot cm$.

<The Volume Resistivity of the CNT>

For the herein disclosed art, the volume resistivity of the CNT used in the electrode structure can be acquired by carrying out a resistivity measurement based on, for example, the four-terminal four-probe method. The specific procedure is as follows. 10 mg of the CNT to be measured is dispersed in a liquid medium (for example, ethanol) and the obtained dispersion is suction filtered using a Buchner funnel and a membrane filter having a diameter of 47 mm to produce a paper-like test specimen on the filter. Four needle-shaped probes (electrodes) are then placed in contact with the test specimen, and the resistance of the test specimen is determined from the potential difference produced between the two inner probes when current flows between the two outer probes. The volume resistivity of the CNT can be calculated from the measured resistance and the thickness of the test specimen. This resistivity measurement can be performed using a volume resistivity meter (for example, Loresta-GP, Mitsubishi Chemical Analytech Co., Ltd.).

The CNT used in the construction of the herein disclosed electrode structure has a volume resistivity of not more than $2 \times 10^{-2}$ $\Omega \cdot cm$ as measured by the resistivity measurement described above. This enables the realization of a thin-film electrode structure that exhibits a low resistance and an excellent film strength. While not intended as a particular limitation, the reason for the appearance of these effects is thought to be, for example, as follows. That is, CNT having a low volume resistivity presents few structural defects (is highly crystalline) and has a high specific surface area, and as a consequence a large intermolecular force is exhibited between individual CNTs. In addition, the conduction path is longer than heretofore (typically has a high aspect ratio), and due to this a strong, fine, and dense network is formed by the CNTs and the powdered electrode material can then be favorably confined in this network. This is thought to contribute to an enhanced reduction in the resistance and an enhanced film strength.

From the standpoint of realizing an electrode structure having a low resistance and an excellent film strength, CNT having a volume resistivity of not more than $2 \times 10^{-2}$ $\Omega \cdot cm$ can be advantageously used as the CNT here. The volume resistivity of the CNT is preferably not more than $8 \times 10^{-3}$ $\Omega \cdot cm$, more preferably not more than $7 \times 10^{-3}$ $\Omega \cdot cm$, and still more preferably not more than $5 \times 10^{-3}$ $\Omega \cdot cm$. For example, the volume resistivity of the CNT may be not more than $3 \times 10^{-3}$ $\Omega \cdot cm$ and typically may be not more than $1 \times 10^{-3}$ $\Omega \cdot cm$. In addition, the lower limit on the volume resistivity of the CNT is not particularly limited, but viewed from the standpoint of ease of production and so forth, it is, for example, at least $5 \times 10^{-6}$ $\Omega \cdot cm$ and is typically at least $8 \times 10^{-6}$ $\Omega \cdot cm$, for example, at least $1 \times 10^{-6}$ $\Omega \cdot cm$. The herein disclosed art can be advantageously executed by an embodiment in which the volume resistivity of the CNT is at least $7 \times 10^{-6}$ $\Omega \cdot cm$ and not more than $8 \times 10^{-3}$ $\Omega \cdot cm$ (typically at least $5 \times 10^{-5}$ $\Omega \cdot cm$ and not more than $7 \times 10^{-4}$ $\Omega \cdot cm$). An electrode structure having an even better reduction in the resistance and an even better film strength can be realized by having the volume resistivity be not more than $7 \times 10^{-4}$ $\Omega \cdot cm$.

CNT having a G/D ratio as measured by Raman spectroscopic analysis of at least 50 is preferably used for the CNT here. CNT having a larger G/D ratio has fewer surface defects and the intermolecular force between individual CNTs is then effectively increased. The function as a binder can be better expressed as a result. Viewed in terms of improving the film strength, the G/D ratio of the CNT is preferably at least 70, more preferably at least 100, and particularly preferably at least 120. For example, the G/D ratio of the CNT may be at least 150 and typically may be at least 180 and, for example, may be at least 200 (typically at least 220). The upper limit on the G/D ratio of the CNT is not particularly limited, but, viewed in terms of the ease of production and so forth, may be, for example, not more than 500 and typically not more than 400, for example, not more than 300. The herein disclosed art can be advantageously realized by an embodiment in which the G/D ratio of the CNT is at least 50 and not more than 400 (more preferably at least 100 and not more than 300, for example, at least 120 and not more than 280). In this Description, the G/D ratio of the CNT can be acquired, by measurement by Raman spectroscopic measurement at a laser wavelength of 532 nm, as the ratio between the height of the G band at around 1600 cm$^{-1}$ and the height of the D band at around 1350 cm'. This Raman spectroscopic measurement can be performed using a Raman spectroscope (for example, InnoRam, B & W Tek).

The average value of the aspect ratio (length/diameter of the CNT) of the CNT is not particularly limited insofar as the volume resistivity satisfies the range given above, but it is typically at least 100. The CNTs more readily undergo mechanical intertwining with each other at larger CNT aspect ratios, which supports a more favorable expression of the functions as a binder and an electroconductive material. As a result, the effect of the application of the herein disclosed art can be appropriately exhibited. Viewed from the standpoint of, for example, lowering the resistance and raising the film strength, the average value of the CNT aspect ratio is preferably at least 250, more preferably at least 500, still more preferably at least 800, and particularly preferably at least 1,000. The upper limit for the CNT aspect ratio is not particularly limited, but viewed in terms of the handling properties and ease of production, it is suitably not more than about 25,000 and is preferably not more than 20,000, more preferably not more than 15,000, still more preferably not more than 12,000, and particularly preferably not more than 10,000. For example, CNT having an average aspect ratio for the CNT of 100 to 10,000 is suitable. The values obtained typically by measurement based on electron microscopic observation can be used for the average aspect ratio (length/diameter of the CNT), average length, and average diameter of the CNT.

The average diameter of the CNT is preferably not more than about 50 nm. From the perspective of lowering the resistance and raising the film strength, the average value of the CNT diameter is preferably not more than 30 nm, more preferably not more than 10 nm, and still more preferably not more than 5 nm. The lower limit for the CNT diameter (average value) is not particularly limited, but is suitably at least about 0.1 nm and is preferably at least 0.5 nm and is more preferably at least 1 nm. For example, CNT having an average CNT diameter of at least 0.5 nm and not more than 10 nm (preferably at least 1 nm and not more than 5 nm) is advantageous.

The average length of the CNT is typically suitably at least 1 μm. Viewed in terms of lowering the resistance and raising the film strength, the average value of the CNT length is preferably at least 3 μm, more preferably at least 5 μm, still more preferably at least 8 μm, and particularly preferably at least 10 μm (for example, more than 10 μm). The upper limit on the CNT length (average value) is not particularly limited, but is suitably not more than about 30 μm, for example, not more than 25 μm and typically not more than 20 μm (for example, not more than 15 μm). For example, CNT having a CNT average length of at least 5 μm and not more then 30 μm (preferably more than 10 μm and not more than 25 μm and typically at least 12 μm and not more than 20 μm) is advantageous.

The purity of the CNT is not particularly limited insofar as the volume resistivity satisfies the range given above, but is typically at least 85%. Viewed in terms of lowering the resistance and raising the film strength, the CNT purity is preferably at least 90% and more preferably at least 95%. The upper limit on the CNT purity is not particularly limited, but, from the perspective of the ease of production and so forth, is typically not more than 99% and, for example, may be not more than 98%. The herein disclosed art can be advantageously executed, for example, by an embodiment in which the CNT purity is at least 85% and up to and including 100% (typically at least 95% and not more than 99%). The value provided by measurement using a thermogravimetric analysis (TGA) instrument can be used for the CNT purity in this Description.

The material of the CNT is not particularly limited insofar as the volume resistivity satisfies the range indicated above. The CNT may be, for example, single-walled carbon nanotube (SWNT: for example, 1 to 3 layers and typically 1 layer or 2 layers) or may be multi-walled carbon nanotube (MWNT: for example, 4 to 200 layers and typically 4 to 60 layers). The CNT may contain single-walled CNT and multi-walled CNT in any proportion therebetween (a single-walled CNT:double-walled CNT mass ratio of, for example, 100:0 to 50:50 and preferably 100:0 to 80:20), but, viewed in terms of the function as a binder, CNT composed substantially of only single-walled CNT is preferred. The structure of the graphene sheet is not particularly limited and may be any type, i.e., chiral (helical), zig-zag, or armchair. In addition, the CNT may contain, for example, the catalyst metal used in CNT synthesis (this catalyst metal is present as a residue). This catalyst metal can be, for example, at least one metal selected from the group consisting of Fe, Co, and platinum group elements (Ru, Rh, Pd, Os, Ir, Pt) or can be an alloy in which these metals are the main component. These catalyst metals can be present in the CNT typically in a microparticulate form (for example, an average particle diameter of approximately 3 nm to 100 nm). In a preferred embodiment of the herein disclosed electrode structure, at least 85 atom % of the carbonaceous material (more preferably at least 90 atom %) is the carbon atom (C). At least 95 atom % of the carbonaceous material may be the carbon atom and at least 99 atom % may be the carbon atom, and the CNT may be substantially composed of only the carbon atom. CNT provided by the execution of any post-treatment (for example, a purification treatment such as removal of the amorphous carbon, removal of the catalyst metal, and so forth) on the product yielded by the CNT production methods described below may be used as the CNT under consideration.

The CNT content in the electrode structure is not particularly limited, but is typically not more than 10 mass % and, viewed from the perspective of obtaining a thin-film electrode structure, is preferably not more than 8 mass %, more preferably not more than 5 mass %, and still more preferably not more than 3 mass %. For example, the CNT content may be not more than 2 mass % and may typically be not more than 1 mass % (for example, less than 1 mass %). Viewed from the perspective of lowering the resistance and raising the film strength, the CNT content is suitably at least about 0.01 mass % and is preferably at least 0.05 mass % and is more preferably at least 0.08 mass %. The herein disclosed art can be advantageously executed, for example, by an embodiment in which the content of the CNT in the electrode structure is at least 0.01 mass % and not more than 10 mass % (preferably at least 0.08 mass % and not more than 5 mass %).

<The Electrode Material>

The herein disclosed electrode structure contains a powdered electrode material. The primary materials of the various electrodes used in electronic devices of the type under consideration (also referred to below as the electrode primary material) can be used without particular limitation as this electrode material. For example, when the electrode structure is the positive electrode for a lithium ion secondary battery, a positive electrode active material capable of the reversible insertion and release of the lithium ion can be incorporated as the electrode primary material. This positive electrode active material can be exemplified by oxides containing lithium and a transition metal element as constituent metal elements (lithium transition metal oxides), e.g., lithium nickel oxide (for example, $LiNiO_2$), lithium cobalt oxide (for example, $LiCoO_2$), and lithium manganese oxide (for example, $LiMn_2O_4$), and by phosphates containing lithium and a transition metal element as constituent metal elements, e.g., lithium manganese phosphate ($LiMnPO_4$) and lithium iron phosphate ($LiFePO_4$). When the electrode structure is a negative electrode for a lithium ion secondary battery, a negative electrode active material capable of the reversible insertion and release of the lithium ion can be incorporated as the electrode primary material. The negative electrode active material can be exemplified by carbonaceous materials such as graphite, graphitization-resistant carbon (hard carbon), easily graphitizable carbon (soft carbon), and amorphous carbon; lithium transition metal oxides such as lithium titanate; lithium transition metal nitrides; and silicon compounds.

An active carbon can be incorporated as the electrode primary material when the electrode structure is an electrode for an electric double-layer capacitor. The various materials used as active carbon in this type of electric double-layer capacitor can be used without particular limitation as the active carbon here. For example, active carbon obtained by carbonizing and activating a carbonaceous material, e.g., a mineral type, plant type, resin type, and so forth, can be preferably used. Examples of mineral-type carbonaceous materials are coal (e.g., lignite, brown coal, bituminous coal, and anthracite), cokes, infusibilized pitch, oil carbon, and so forth. The plant-type carbonaceous materials can be exemplified by charcoal, coconut shell, sawdust, wood chips, peat, and so forth. The resin-type carbonaceous materials can be exemplified by phenolic resins. The carbonization and activation treatment of the carbonaceous material can be carried out by a heretofore known method. Alternatively, a commercially available active carbon may be purchased and used.

When the electrode structure is an electrode for a polymer electrolyte fuel cell, a catalyst-supporting carbon, in which a catalyst is supported on a carbon support, can be incorporated as the electrode primary material. The following can be used as the catalyst supported on the carbon support: noble metals such as platinum, ruthenium, rhodium, palladium, silver, osmium, and iridium; base metals such as iron, nickel, manganese, cobalt, chromium, copper, zinc, molybdenum, tungsten, germanium, and tin; and alloys of these noble metals and base metals, or their compounds such as metal oxides and metal complexes.

The content of the electrode primary material in the electrode structure is not particularly limited, but is at least about 90 mass % and, viewed in terms of obtaining a thinner thin-film electrode structure, is preferably at least 92 mass %, more preferably at least 95 mass %, and still more preferably at least 97 mass %. For example, the content of the electrode material may be at least 98 mass % and typically may be at least 99 mass % (for example, more than 99 mass %). Viewed from the perspective of lowering the resistance and raising the film strength, the content of the electrode primary material is suitably not more than 99.99 mass % and is preferably not more than 99.95 mass % and more preferably not more than 99.92 mass %. The herein disclosed art can be advantageously executed by an embodiment in which, for example, the content of the electrode primary material in the electrode structure is at least 90 mass % and not more than 99.99 mass % (preferably at least 95 mass % and not more than 99.92 mass %).

The herein disclosed electrode structure may also contain, in a range in which the effects of the present invention are not impaired, an electrode material (also referred to below as the electrode additional material) other than the electrode primary material described in the preceding. This electrode additional material can be exemplified by resin binders, electroconductive materials, thickeners, and so forth. The content of this electrode additional material, within the overall mass of the electrode material present in the electrode structure, is suitably, for example, not more than 10 mass % and is preferably not more than 7 mass %, more preferably not more than 5 mass %, and particularly preferably not more than 3 mass %.

The herein disclosed electrode structure preferably substantially does not contain a resin binder as an electrode material. The resin binder referenced here can be specifically exemplified by the following: polyvinyl alcohol (PVA), polyvinylidene fluoride (PVDF), fluororesins (for example, polytetrafluoroethylene (PTFE)), rubbers (vinyl acetate copolymers, styrene-butadiene copolymers (SBR)), polyacrylonitrile (PAN), and cellulosic polymers (carboxymethyl cellulose (CMC). These resin binders act as a resistive component and as a consequence are a cause of limitations on reductions in the resistance. Another problem that can be produced is that the presence of a resin binder places limits on increasing the content of the electrode material. In contrast to this, the herein disclosed electrode structure, by substantially not containing a resin binder, can extinguish the following disadvantages: the inability to obtain satisfactory characteristics due to the large electrode resistance caused by the resin binder; the limitation imposed by the presence of the resin binder on increasing the electrode material content. In addition, the electrode thickness can be made smaller than in a conventional electrode that uses a resin binder component, and as a consequence a thin-film electrode can be realized that is adapted for size reduction and thickness reduction without reducing the amount of use of the electrode primary material. In a preferred embodiment, the thickness of the electrode structure using the aforementioned CNT can be equal to or less than ½ (preferably equal to or less than ⅓ and more preferably equal to or less than ¼) of the thickness of a conventional electrode structure that uses a resin binder.

In the herein disclosed art, the electrode material is strongly internally cohesive due to the binding forces caused by the intermolecular forces between the CNTs and the form or shape of the electrode structure can be suitably maintained thereby. A metal foil (for example, aluminum foil, copper foil, nickel foil, titanium foil, stainless steel foil, and so forth) current collector is unnecessary as a result. That is, the herein disclosed art can be advantageously executed by an embodiment in which the electrode structure does not contain a current collector. By omitting the current collector from the electrode structure, the structure of the electrode can be simplified and a thin-film electrode structure adapted for further reductions in size and weight can be realized. In addition, the following disadvantages can be extinguished by not incorporating a current collector in the electrode structure: the inability to obtain satisfactory characteristics due to the large electrode resistance caused by the interfacial resistance (contact resistance) between the current collector and electrode material; the increase in production costs caused by the slurry viscosity control and temperature/ humidity control that can be required when the electrode material is coated on the current collector.

<Method for Producing the Electrode Structure>

The herein disclosed electrode structure can be produced via the following steps (1) to (4).

(1) Preparation (by purchase or synthesis) of CNT having a volume resistivity of not more than $2\times10^{-2}$ Ω·cm.
(2) Preparation of a dispersion in which the CNT and the powdered electrode material are dispersed in a liquid medium, wherein the dispersion substantially does not contain a resin binder.
(3) Filtration of this dispersion on a filter to obtain an agglomerate of the CNT and the electrode material on the filter.
(4) Drying of the agglomerate.

<(1) Preparation of CNT>

The herein disclosed CNT can be synthesized by the flowing gas-phase CVD method. In the flowing gas-phase CVD method, a carbon starting material containing a catalyst and a reaction promoter is converted into a spray and introduced into a furnace heated to high temperatures in order to produce CNT in a flowing gas phase. This method can provide, through suitable control of the reaction space, CNT having a volume resistivity lower than heretofore.

A flowing gas-phase CVD apparatus 1 according to an embodiment is schematically illustrated in FIG. 1. The flowing gas-phase CVD apparatus 1 illustrated in FIG. 1 is provided with a cylindrical chamber 10; a carbon source feed section 30, which feeds a carbon source A into the chamber 10 from a carbon source feed port 32 that opens into the chamber 10; a gas feed section 80, which feeds a nonoxidizing gas into the chamber 10 from a gas feed port 82 that opens into the chamber 10; an exhaust line 50, which is constituted to enable discharge of the gas within the chamber 10; and a valve 60 disposed in the exhaust line 50.

The carbon source feed section 30 is constituted so as to feed (for example, spray) the carbon source A into the chamber 10 through the carbon source feed port 32 that opens into the chamber 10. In this embodiment, the carbon source feed section 30 is provided with a carbon source introduction line 34, which extends within a reaction zone 20, infra, within the chamber 10 and communicates with the carbon source feed port 32. The carbon source feed port 32, which is disposed at the end of the carbon source introduction line 34, opens into the reaction zone 20 or the vicinity thereof. The carbon source feed port 32 disposed at the end of the carbon source introduction line 34 opens into the upstream side of the chamber 10. Through such a construction in which the carbon source A is directly fed into the reaction zone 20 (high-temperature region), the carbon source (typically a liquid) A fed through the carbon source feed port 32 then undergoes a rapid gasification (vaporization). In addition, through the use of the carbon source introduction line 34, heat from the reaction zone 20 passes through the wall surface of the carbon source introduction line 34 from the carbon source feed port 32 and is transmitted to the carbon source (liquid) A in the introduction line 34, which supports the rapid gasification of the carbon source A fed from the carbon source feed port 32. For example, toluene, benzene, and so forth may be used as the carbon source.

The carbon source feed section 30 feeds the above-described carbon source along with a catalyst metal or catalyst metal compound into the chamber 10 from the carbon source feed port 32. Preferably at least one of Fe and Co is used as the catalyst metal. The catalyst metal compound can be exemplified by organotransition metal compounds, inorganic transition metal compounds, and so forth. Ferrocene is an example of an organotransition metal compound. Among the preceding, the use of ferrocene is preferred.

The carbon source feed section 30 feeds a reaction promoter along with the above-described carbon source and catalyst metal into the chamber 10 from the carbon source feed port 32. This reaction promoter can be exemplified by organosulfur compounds, inorganic sulfur compounds, and so forth. The organosulfur compounds can be exemplified by sulfur-containing heterocyclic compounds such as thiophene, thianaphthene, benzothiophene, and so forth. The inorganic sulfur compound can be exemplified by hydrogen sulfide. Among the preceding, the use of thiophene is preferred.

The gas feed section 80 is structured so as to feed a nonoxidizing gas (carrier gas) into the chamber 10 from the gas feed port 82, which opens into the chamber 10. In this embodiment, the gas feed section 80 is provided with a gas feed line 84, which extends within the reaction zone 20 and communicates with the gas feed port 82. The gas feed port 82, which is disposed at the end of the gas feed line 84, opens into the reaction zone 20 or the vicinity thereof. The gas feed port 82, which is disposed at the end of the gas feed line 84, opens into the upstream side of the chamber 10.

A reducing gas (for example, $H_2$ gas) can be used as the carrier gas that is fed to the chamber 10 through the gas feed port 82. In addition, the nonoxidizing gas fed to the chamber 10 through the gas feed port 82 contains a carbon source gas that is a gas at normal temperature. The carbon source gas is preferably a substance that undergoes pyrolysis at a temperature lower than that of the carbon source that is fed into the chamber 10 from the aforementioned carbon source feed port 32. Examples of carbon source gases having this property are unsaturated aliphatic hydrocarbons such as ethylene and propylene, which have a double bond, and acetylene, which has a triple bond. Mixtures thereof may be used as the carbon source gas.

In the example given in the figure, the gas feed section 80 and the carbon source feed section 30 have a double coaxial pipe structure in which the gas feed line 84 is the outer pipe and the carbon source introduction line 34 is the inner pipe. Here, the carbon source feed port 32 disposed at the end of the carbon source introduction line 34 protrudes out to the downstream side (below) from the gas feed port 82 disposed at the end of the gas feed line 84. By doing this, the nonoxidizing gas fed from the gas feed port 82 comes into contact with the carbon source (liquid) fed from the carbon source feed port 32, thereby promoting the gasification and diffusion of this carbon source (liquid).

The exhaust line 50 is constituted to enable discharge of the gas within the chamber 10 through a gas vent 52 disposed downstream from a deposition zone 22, infra, of the chamber 10. In this embodiment, the gas vent 52 of the exhaust line 50 opens into a side surface of a recovery section (recovery vessel) 70, infra, which is connected at the downstream side (below) of the chamber 10. The valve 60 is disposed along the course of the exhaust line 50. During normal use (that is, during CNT production), the valve 60 is controlled to be in the closed state. During CNT recovery, infra, it is switched from the closed state to the open state. In addition, in this embodiment, the exhaust line 50 is provided with a bypass line 54 that does not run through the valve 60. Due to this, even when the valve 60 resides in a closed state, a certain amount of gas is discharged through the bypass line 54 and from the gas vent 52. Specifically, through a judicious selection of the balance between the amount of nonoxidizing gas (carrier gas) fed into the chamber 10 from the gas feed port 82 and the amount of gas discharged through the bypass line 54 from the gas vent 52 with the valve 60 closed, the movement of the gasified carbon source can be controlled so the gasified carbon source does not diffuse to the upstream side or downstream side from the reaction zone 20 (i.e., the gasified carbon source remains within the reaction zone 20).

The chamber 10 is formed in the shape of a straight tube. The length of the chamber 10 is not particularly limited, but can be approximately 1,400 mm, within which the length of the reaction zone 20 can be approximately 800 mm and the length of the deposition zone 22 can be approximately 400 mm. The opening on the upstream side of the chamber 10 is closed by an upstream cap 12. The downstream end of the chamber 10, on the other hand, resides in an open condition.

The reaction zone 20 is a zone in which the interior of the chamber 10 is heated to a temperature at which CNT is produced. A heater 3 surrounds a portion of the range (here, the upper part and the middle part) along the direction of the cylindrical axis of the chamber 10. The area located in the interior in this surrounded region forms the reaction zone 20. The heater 3 heats the reaction zone 20 to a temperature at which CNT is produced. Through this heating of the reaction zone 20 to a temperature at which CNT is formed, the carbon source fed from the carbon source feed port 32 is gasified (vaporized) and is also pyrolyzed to produce CNT. From the perspective of reducing the volume resistivity of the CNT, the heating temperature can be set to at least 1,300° C. (preferably at least 1,350° C.) and not more than 1,400° C. (for example, 1,380° C.).

The deposition zone 22 is a zone disposed within the chamber 10 downstream from the reaction zone 20 and is a zone where the produced CNT 24 is cooled and deposited. That is, the CNT 24, which is produced in the reaction zone 20 by pyrolysis of the carbon source, moves to the deposition zone 22 and is cooled and typically is deposited in the vicinity of the outlet of the chamber 10. Accompanying this, the vicinity of the outlet of the chamber 10 is gradually thickly coated by the CNT 24. Through this thick coating by CNT (eventually close to an occluded condition) of the deposition zone 22, which is downstream from the reaction zone 20, the gasified carbon source remains in the reaction zone 20 (that is, diffusion to downstream from the reaction zone 20 is restrained). The CNT deposited in the deposition zone 22 can be recovered by switching the valve 60 to an open condition. That is, when the valve 60 is switched to the open condition, a large amount of the high-pressure gas retained in the reaction zone 20 (gasified carbon source and nonoxidizing gas) is discharged via the deposition zone 22 and the recovery section 70 and through the gas vent 52. The CNT deposited in the deposition zone 22 is then entrained in the gas flow and is moved to the recovery section 70 and can be recovered at the recovery section 70.

Using the flowing gas-phase CVD apparatus 1 having the described constitution, CNT is caused to deposit (typically attached to the inner wall of the chamber) in the deposition zone 22 when the valve 60 is closed, and as a result the gasified hydrocarbon source is retained in the reaction zone 20 upstream from the deposition zone 22 (diffusion to the downstream side of the reaction zone 20 is suppressed) and the carbon source concentration and pressure are effectively increased in the reaction zone 20. CNT having a volume resistivity reduced (typically to a volume resistivity lower than $2 \times 10^{-2}$ Ω·cm) from conventional values can be produced from the carbon source by heating the reaction zone 20, while it is in this high-concentration and high-pressure condition, into the high-temperature region of 1,300° C. to 1,400° C. When deposition of the CNT in the deposition zone 22 has progressed to a certain degree, the valve 60 is opened and the CNT deposited in the deposition zone 22 is recovered, thus enabling continuous CNT production.

<(2) Preparation of the Dispersion>

A dispersion—of the CNT and a powdered electrode material dispersed in a liquid medium (typically a medium that is a liquid at least at room temperature)—is then prepared in the method for producing the herein disclosed electrode structure.

The liquid medium for dispersion of the CNT and electrode material is preferably a liquid medium in which the solvent content is at least 95 mass % (in other words, the content of components other than the solvent, i.e., the nonvolatile fraction, is less than 5 mass %), while a liquid medium in which this content is at least 99 mass % is more preferred. The liquid medium may be a liquid medium that substantially does not contain a nonvolatile fraction. The composition of the solvent that constitutes this liquid medium can be selected as appropriate in conformity with the purpose and conditions, and, for example, water, an organic solvent, or a mixed solvent thereof can be used. The use is preferred of a solvent that can be easily removed by heating (for example, in the temperature range of 200° C. and below, and more preferably 120° C. and below). The organic solvent can be, for example, any one solvent or two or more solvents selected from lower alcohols (for example, alcohols having about 1 to 5 carbon atoms, e.g., methanol, ethanol, and propanol), lower ketones (e.g., acetone, methyl ethyl ketone), acetate esters of lower alcohols (for example, ethyl acetate), and so forth. Among the preceding, the use of a lower alcohol, e.g., ethanol, propanol, and so forth, is preferred.

The dispersion under consideration can be advantageously prepared by combining the liquid medium with the solids fraction comprising the CNT and the electrode material and carrying out at least one of a stirring process and an ultrasound treatment. There is no particular limitation on the use proportions between the solids fraction and the liquid medium. For example, a proportion of 5 mL to 40 mL liquid medium per 100 mg of the solids fraction can be used.

The aforementioned stirring process can advantageously use, for example, a process (high-speed stirring process) of stirring the carbonaceous material, electrode material, and liquid medium by the high-speed rotation (high rotation rate) of a stirring element of appropriate shape. For example, this high-speed stirring process is preferably carried out using a stirring apparatus with a construction in which a stirring element (stirring blade) having a slender plate shape or propeller shape, or a cutter knife, is attached to a stirring shaft that is connected to a motor. The CNT and electrode material may be dispersed in the liquid medium by execution of the aforementioned stirring process (this can be the high-speed stirring process described in the preceding) and the ultrasound treatment in combination in any sequence or at the same time (in parallel). In a preferred embodiment, the CNT and liquid medium are preliminarily mixed; a stirring process is carried out; and the electrode material is then introduced and an ultrasound treatment is performed. By doing this, a dispersion is obtained in which the CNT and electrode material are dispersed to uniformity in the liquid medium.

<(3) Filtration on a Filter>

The resulting dispersion is then filtered on a filter in the method for producing the herein disclosed electrode structure. By doing this, a CNT+electrode material agglomerate (aggregate), which is present in the dispersion, can be collected on the filter. The material and shape of the filter used for filtration are not particularly limited, and use can be made, in conformity to the objective, of a suitable selection from the various filters generally used for solid-liquid separation. A sheet-shaped filter (typically filter paper) can ordinarily be used. For example, filter paper in which the main component is a cellulosic fiber can be used.

Filtration of the dispersion can be advantageously carried out using a mode in which the pressure on the filtrate discharge side of the filter is lower than on the dispersion feed side. Through the use of this mode of filtration, the filtration rate can be increased and the carbonaceous material and electrode material can also be more favorably agglomerated. For example, a mode can be preferably used in which this filtration is performed by setting a filter (typically filter paper) flat in a nutsche (also referred to as a Buchner funnel). This mode is suitable for the agglomeration of the CNT and electrode material on the filter. Either suction filtration, in which the pressure is reduced on the filtrate discharge side, or pressure filtration, in which the pressure is raised on the dispersion feed side, may be used, but the use of suction filtration is more preferred. This enables a more favorable agglomeration (typically at a higher density) of the CNT and electrode material on the filter. Or, filtration may be performed using about the same pressure on the filtrate discharge side as on the dispersion feed side (typically filtration using mainly the weight of the dispersion (natural filtration)).

<(4) Drying of the Agglomerate>

The CNT+electrode material agglomerate is then separated from the filter and dried in the method for producing the herein described electrode structure. Heretofore known drying methods, e.g., normal temperature drying, heated drying, reduced pressure drying, and so forth, can be used as appropriate as the method for drying the agglomerate. The agglomerate is dried by the application of heat in a preferred embodiment. For example, the damp agglomerate may be dried in a heated furnace. The heating temperature during drying of the agglomerate can be set as appropriate considering, for example, the composition of the liquid medium (particularly the boiling point of the solvent). The drying temperature is generally preferably about 40° C. to 250° C. (for example, about 60° C. to 150° C.).

This evaporation of the liquid medium by drying the agglomerate can provide an electrode structure that substantially does not contain a resin binder component and that comprises an agglomerate of a powdered electrode material and CNT having a volume resistivity of not more than $2 \times 10^{-2}$ Ω·cm. As necessary, drying may be followed by pressing (for example, roll pressing) of the electrode structure.

<Applications>

The herein disclosed electrode structure, because it is a thin-film electrode structure having a low resistance and an excellent film strength as described above, can be favorably used as an electrode incorporated in various types of electronic devices. It is advantageous, for example, as an electrode incorporated in a lithium ion secondary battery, an electric double-layer capacitor (including asymmetric electric double-layer capacitors, for example, hybrid capacitors), or a polymer electrolyte fuel cell.

<Lithium Ion Secondary Batteries>

Figure 2:
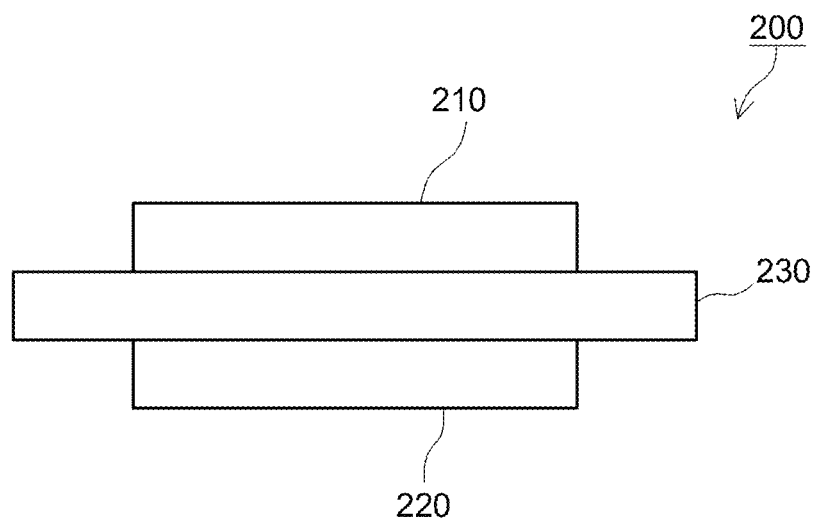
FIG. 2 is a diagram that schematically illustrates a lithium ion secondary battery according to an embodiment of the present invention.

As shown in FIG. 2, a lithium ion secondary battery 200 can contain a separator 230, a positive electrode 210 and a negative electrode 220 disposed facing each other with a separator 230 interposed therebetween, and a nonaqueous electrolyte solution (not shown). The herein disclosed electrode structure can be used for either one or both (preferably both) of the positive electrode 210 and negative electrode 220 of the lithium ion secondary battery 200 under consideration. In this application, the use of a thin-film positive electrode 210 and/or negative electrode 220 exhibiting a low resistance and high film strength makes it possible to raise the performance (for example, reducing the resistance, raising the capacity, raising the energy density, increasing the durability) of the lithium ion secondary battery 200, and as a consequence the application of the herein disclosed art is particularly significant.

The same separators as heretofore used can be used as the separator 230. For example, a porous sheet (porous film) of a polyolefin resin, e.g., polyethylene (PE), polypropylene (PP), and so forth, can be used. Or, use can be made of a nonwoven fabric of a fiber of, e.g., cellulose, glass, polyethylene terephthalate (PET), polyamide, polyimide, polyamideimide, polyacrylonitrile, wholly aromatic polyester, and so forth.

In a preferred embodiment, the filter used for filtration of the CNT+electrode material agglomerate from the dispersion in the above-described electrode structure production process is utilized as the separator. That is, the carbonaceous material+electrode material agglomerate collected on the filter (separator) during the electrode structure production process is recovered along with the filter (separator) and drying is performed on this. This enables the preparation of a unified separator/electrode element in which the separator and electrode are formed into a single article. This embodiment makes it possible to efficiently obtain a unified separator/electrode element in which the separator and electrode are formed into a single article.

The same nonaqueous electrolyte solutions as used in conventional lithium ion secondary batteries can be used without particular limitation as the electrolyte solution (nonaqueous electrolyte solution) here. This nonaqueous electrolyte solution typically has a composition of a supporting salt incorporated in a suitable nonaqueous solvent. The following, for example, can be used as this nonaqueous solvent: a single selection or two or more selections from the group consisting of ethylene carbonate, propylene carbonate, dimethyl carbonate, diethyl carbonate, ethyl methyl carbonate, 1,2-dimethoxyethane, 1,2-diethoxyethane, tetrahydrofuran, 1,3-dioxolane, and so forth. The following, for example, can be used as the supporting salt: lithium salts such as $LiPF_6$, $LiBF_4$, $LiAsF_6$, $LiCF_3SO_3$, $LiC_4F_9SO_3$, $LiN(CF_3SO_2)_2$, and $LiC(CF_3SO_2)_3$.

There are no particular limitations on the structure of the lithium ion secondary battery. For example, the structure may be one in which an outer case houses a wound electrode assembly provided by winding a sheet-shaped positive electrode and a sheet-shaped negative electrode with a separator interposed therebetween, or may be a structure in which an outer case houses a stacked electrode assembly provided by the repeated stacking of a positive electrode, separator, negative electrode, and separator in the indicated sequence. The lithium ion secondary battery according to this embodiment may be a cylindrical battery or a prismatic battery in which the outer case has a cylindrical shape or a rectangular parallelepiped shape, or may have a small coin shape. Various other configurations are also possible, e.g., button batteries, paper batteries, and so forth.

<Electric Double-Layer Capacitors>

The electric double-layer capacitor can contain, for example, a pair of electrodes (positive electrode and negative electrode), a separator interposed between these electrodes, and an electrolyte solution. The herein disclosed electrode structure can be used for either or both (preferably both) of the electrodes in the electrode pair in this electric double-layer capacitor. In this application, the use of a thin-film electrode exhibiting a low resistance and high film strength makes it possible to raise the performance (for example, reducing the resistance, raising the capacity, raising the energy density, increasing the durability) of the electric double-layer capacitor, and as a consequence the application of the herein disclosed art is particularly significant. The same separators as for the previously described lithium ion secondary battery can be used as the separator here.

An aqueous or nonaqueous electrolyte solution can be used for the electrolyte solution. A suitable nonaqueous solvent that contains a supporting salt can be used for the nonaqueous electrolyte solution. The following, for example, can be used as the supporting salt: quaternary ammonium salts, e.g., $(C_2H_5)_4NBF_4$, $(C_2H_5)_3CH_5NBF_4$, $(C_4H_9)_4NBF_4$, $(C_6H_{13})_4NBF_4$, $(C_2H_5)_3CH_3NBF_4$, $(C_2H_5)_4NBF_4$, and $(C_3H_7)_4NBF_4$, and lithium salts such as $LiPF_6$, $LiBF_4$, $LiAsF_6$, $LiCF_3SO_3$, $LiC_4F_9SO_3$, $LiN(CF_3SO_2)_2$, and $LiC(CF_3SO_2)_3$. The nonaqueous solvent can be exemplified by carbonates, ethers, ketones, lactones, sulfolane-type hydrocarbons, halogenated hydrocarbons, and so forth. A solution of an ionically conductive salt in water can be used as the aqueous electrolyte solution. A salt in which an alkali metal, e.g., sodium, potassium, and so forth, is combined with an anion from an inorganic acid, e.g., sulfuric acid, nitric acid, hydrochloric acid, and so forth, or with an anion from an organic acid, e.g., a saturated carboxylic acid, aliphatic carboxylic acid, and so forth, can be used as the ionically conductive salt. Specific examples are sodium chloride, potassium chloride, sodium bromide, sulfuric acid, and so forth.

There are no particular limitations on the structure of the electric double-layer capacitor. For example, the structure may be one in which an outer case houses a wound electrode assembly provided by winding a pair of electrodes having a separator interposed therebetween, or may be a structure in which an outer case houses a stacked electrode assembly provided by stacking a pair of electrodes having a separator interposed therebetween. The electric double-layer capacitor according to this embodiment may be cylindrical or prismatic wherein the outer case has a cylindrical shape or a rectangular parallelepiped shape, or may have a small coin shape. Various other configurations are also possible, e.g., button configurations, paper configurations, and so forth.

<Polymer Electrolyte Fuel Cells>

The polymer electrolyte fuel cell can be, for example, a polymer electrolyte fuel cell that contains a membrane electrode assembly (MEA) in which a fuel electrode (negative electrode), a polymer membrane (electrolyte), and an air electrode (positive electrode) are combined. The herein disclosed electrode structure can be used for either or both (preferably both) of the fuel electrode and air electrode in this polymer electrolyte fuel cell. In this application, the use of a thin-film fuel electrode and/or air electrode exhibiting a low resistance makes it possible to raise the performance (for example, reducing the resistance, lowering the amount of catalyst, increasing the durability) of the polymer electrolyte fuel cell, and as a consequence the application of the herein disclosed art is particularly significant.

Any polymer membrane that can conduct protons can be used without particular limitation. An example is a polymer containing a functional group that exhibits proton conductivity. Functional groups that exhibit proton conductivity can be exemplified by the sulfonic acid group, carboxylic acid group, phosphonic acid group, phosphoric acid group, and so forth. The main backbone of the polymer is, for example, a hydrocarbon-type polymer such as polyolefin or polystyrene, a perfluorocarbon polymer, and so forth.

Specific examples in accordance with the present invention are described below, but this is not intended to limit the present invention to the description in these specific examples.

Test Example 1

Figure 3:
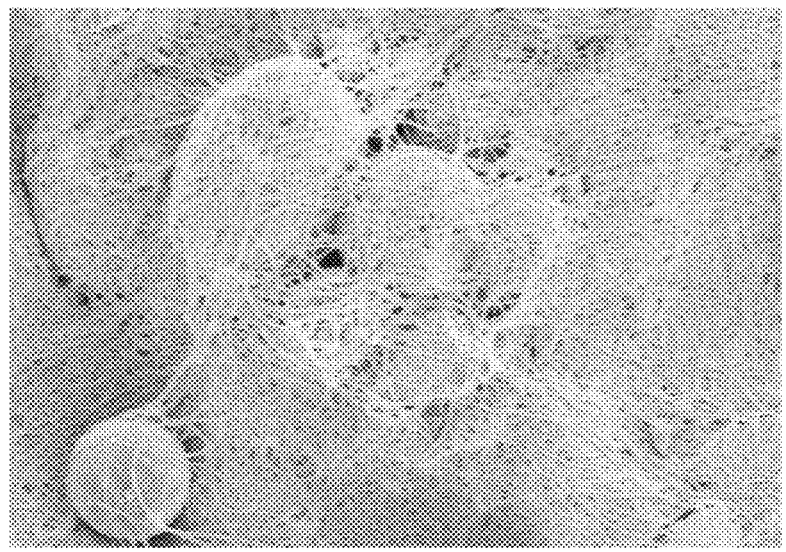
FIG. 3 is an SEM image of the electrode structure according to Example 7.

Single-walled CNTs having different volume resistivities and G/D ratios were prepared. 20 mg of each single-walled CNT was then mixed with 40 mL of the liquid medium and stirring was performed for 1 minute using a Labo Milser from the Iwatani Corporation. 180 mg of active carbon was subsequently introduced and stirring was performed for 30 seconds using an ultrasound homogenizer from Emerson Japan, Ltd. The resulting dispersion was suction filtered using a Buchner funnel and a membrane filter having a diameter of 47 mm to form a film on the filter of a CNT+active carbon agglomerate. This agglomerate was separated from the filter and dried, and an electrode structure according to Examples 1 to 7 was then prepared by roll pressing. A SEM (Scanning Electron Microscope) image of the electrode structure of Example 7 is given in FIG. 3. The volume resistivity and G/D ratio of the CNT used in the electrode structure are given for each example in Table 1. The following were used for the CNTs: "ZEONANO™ SG101" from Zeon Nano Technology Co., Ltd. in Example 1; "SWeNT SG60" from SouthWest NanoTechnologies, Inc. in Example 2; "RN-020" from Raymor Industries, Inc. in Example 3; "EC2.0" from Meijo Nano Carbon Co., Ltd. in Example 4; "EC1.5" from Meijo Nano Carbon Co., Ltd. in Example 5; "EC2.0P" from Meijo Nano Carbon Co., Ltd. in Example 6; and "EC1.5P" from Meijo Nano Carbon Co., Ltd., in Example 7. Econol H from Imazu Chemical Co., Ltd. was used for the liquid medium, and product number "BELLFINE AP11-0010" from AT Electrode Co., Ltd. was used for the active carbon.

The volume resistivity of each of the CNTs used in the examples was determined based on the four-probe method in accordance with the procedure described above. The G/D ratio was determined based on Raman spectroscopic analysis in accordance with the method described above.

The film strength was evaluated on each of the electrode structures obtained in the examples. Specifically, in order to evaluate the degree of immobilization of the electrode material (active carbon), a light impact was applied while the electrode structure was held up vertically. The presence/absence of shedding of the active carbon was checked. A score of "good" was assigned when shedding of the active carbon was not observed here, while a score of "poor" was assigned when shedding by the active carbon was severe and the shape of the electrode could not be maintained. The results are given in Table 1.

TABLE 1

|  | volume resistivity ($\Omega \cdot cm$) | G/D ratio | film strength |
| --- | --- | --- | --- |
| Example 1 | 0.04278 | 4.6 | poor |
| Example 2 | 0.05465 | 16.7 | poor |
| Example 3 | 0.1472 | 33.4 | poor |
| Example 4 | 0.002207 | 76.2 | good |

TABLE 1-continued

| | volume resistivity (Ω · cm) | G/D ratio | film strength |
|---|---|---|---|
| Example 5 | 0.001778 | 156 | good |
| Example 6 | 0.0006869 | 135 | good |
| Example 7 | 0.0003657 | 231 | good |

As shown in Table 1, shedding of the electrode material was not seen in Examples 4 to 7, which used CNTs that had a volume resistivity of not more than $2\times10^{-2}$ Ω·cm, and better results were obtained for the film strength than in Examples 1 to 3. These results confirmed that, through the use of an electrode structure that used CNT having a volume resistivity of not more than $2\times10^{-2}$ Ω·cm, an electrode structure could be realized in which the electrode material was tightly internally cohered substantially without the use of a resin binder.

Test Example 2

Using the herein disclosed electrode structure, an electric double-layer capacitor was fabricated and its performance was evaluated. Specifically, the electrode structure according to Example 7 was punched into a circle with a diameter of 16 mm and this was used as a positive capacitor electrode and a negative capacitor electrode, and these were combined with a separator and an electrolyte solution in a stainless steel container to fabricate a coin-type electric double-layer capacitor according to this example, which had a diameter of 20 mm and a thickness of 3.2 mm (2032 configuration). Glass filter GA-55 from Advantech Co., Ltd. was used as the separator. The electrolyte solution (CPG-00101, Kishida Chemical Co., Ltd.) contained $(C_2H_5)_4NBF_4$ at a concentration of approximately 1 mol/liter as the supporting salt in acetonitrile (AN). The resulting capacitor has a capacitance of 4 F.

For comparison, a paste composition was prepared by mixing 160 mg of active carbon, 20 mg of PTFE as binder, and 20 mg of carbon black as electroconductive material in a suitable solvent. This paste composition was coated and dried on one side of an aluminum foil (current collector) to yield an electrode sheet in which the electrode material was disposed on one side of the current collector. This electrode sheet was then punched into a circle to make a positive capacitor electrode and a negative capacitor electrode, and a comparative coin electric double-layer capacitor was fabricated using the same procedure as in the example as described above.

Each of the exemplary electric double-layer capacitors obtained as described above was charged to 2.5 V at a constant current of 40 mA at an environment temperature of 25° C.; this was followed by constant-voltage charging at 2.5 V for 30 minutes and then measurement of the capacitance during discharge to 0 V at a constant current of 40 mA. The values of the specific energy density and the volumetric energy density were calculated by dividing the measured capacitance by the mass and volume of the electrode, respectively. The volume resistivity of each of the exemplary electrodes was also determined by the aforementioned procedure based on the four-probe method. The results are given in Table 2.

TABLE 2

| | volume resistivity (Ω · cm) | specific energy density (F/g) | volumetric energy density (F/cm³) |
|---|---|---|---|
| example | 0.00385 | 18.1 | 28.2 |
| comparative example | 7.445 | 6.11 | 2.99 |

As shown in Table 2, the example that used carbon nanotube having a volume resistivity of not more than $2\times10^{-2}$ Ω·cm provided better results for all of the features, i.e., specific energy density, volumetric energy density, and volume resistivity, than did the comparative example. Based on these results, it was confirmed that a low-resistance, high energy density electric double-layer capacitor could be realized when an electrode structure with the present constitution was used.

Test Example 3

Using the herein described electrode structure, a positive electrode for use in lithium ion secondary batteries was fabricated and its operation was investigated. Specifically, single-walled CNT was prepared as in Example 7. This single-walled CNT was mixed with a liquid medium and stirring was performed for 1 minute using a Labo Milser from the Iwatani Corporation. $LiCoO_2$ was introduced as the positive electrode active material so as to provide an $LiCoO_2$:CNT mass ratio of 90:10, and stirring was performed for 30 seconds using an ultrasound homogenizer. The resulting dispersion was suction filtered using a Buchner funnel and a membrane filter having a diameter of 47 mm to form a film on the filter of a CNT+$LiCoO_2$ agglomerate. This agglomerate was separated from the filter and was dried and was subsequently roll-pressed to fabricate the electrode structure according to the example.

The resulting electrode structure was punched into a circle with a diameter of 16 mm to produce a positive electrode for use in lithium ion secondary batteries. This positive electrode (working electrode), metal lithium as the negative electrode (counterelectrode), and a separator (a porous sheet with a three-layer structure of PP (polypropylene)/PE (polyethylene)/PP (polypropylene) was used) were combined along with a nonaqueous electrolyte solution in a stainless steel container to fabricate a coin cell having a diameter of 20 mm and a thickness of 3.2 mm (2032 configuration). The nonaqueous electrolyte solution contained $LiPF_6$ as the supporting salt at a concentration of approximately 1 mol/liter in a mixed solvent that contained ethylene carbonate (EC) and dimethyl carbonate (DMC) in a 1:1 volume ratio.

A charge/discharge test was run by subjecting the resulting evaluation coin cell to charging to 4.2 V at a constant current of 1 C and an environment temperature of 25° C. followed by discharge to 3.0 V at a constant current of 1 C. It could be confirmed from the results that the evaluation coin cell could undergo charge/discharge and functioned as a lithium ion secondary battery.

Test Example 4

Using the herein described electrode structure, a lithium ion secondary battery was fabricated and its operation was investigated. Specifically, single-walled CNT was prepared as in Example 7. This single-walled CNT was mixed with a liquid medium and stirring was performed for 1 minute using a Labo Milser from the Iwatani Corporation. Graphite was then introduced as the negative electrode active material so as to provide a graphite:CNT mass ratio of 90:10, and stirring was performed for 30 seconds using an ultrasound homogenizer. The resulting dispersion was suction filtered using a Buchner funnel and a membrane filter having a diameter of 47 mm to form a film on the filter of a CNT+graphite agglomerate. This agglomerate was separated from the filter and was dried and was subsequently roll-pressed to fabricate the electrode structure according this example.

The resulting electrode structure was punched into a circle with a diameter of 16 mm to produce an electrode for use in lithium ion secondary batteries. This electrode (working electrode), metal lithium as the counterelectrode, and a separator (a porous sheet with a three-layer structure of PP (polypropylene)/PE (polyethylene)/PP (polypropylene) was used) were combined along with a nonaqueous electrolyte solution in a stainless steel container to fabricate a coin cell having a diameter of 20 mm and a thickness of 3.2 mm (2032 configuration). The nonaqueous electrolyte solution contained $LiPF_6$ as the supporting salt at a concentration of approximately 1 mol/liter in a mixed solvent that contained ethylene carbonate (EC) and dimethyl carbonate (DMC) in a 1:1 volume ratio.

A charge/discharge test was run by subjecting the resulting evaluation coin cell to charging to 1.5 V at a constant current of 1 C and an environment temperature of 25° C. followed by discharge to 50 mV at a constant current of 1 C. It was confirmed from the results that the evaluation coin cell could undergo charge/discharge and functioned as a lithium ion secondary battery.

An electrode structure for electronic devices according to an embodiment of the present invention has been described above, but the electrode structure for electronic devices according to the present invention is not limited to or by any of the embodiments described in the preceding and various modifications and alterations can be made.

INDUSTRIAL APPLICABILITY

The present invention can provide a thin-film electrode structure for electronic devices, wherein the electrode structure has a low resistance and an excellent film strength.

The invention claimed is:

1. A method of producing a film-like electrode structure for an electronic device, the method comprising the steps of:
   producing carbon nanotubes in a flowing gas phase;
   preparing a dispersion having the carbon nanotubes dispersed in a liquid medium with at least one of a powdered active carbon dispersed in the liquid medium and carbon black dispersed in the liquid medium;
   filtering the dispersion with a filter to obtain a film of an agglomerate electrically conductively and structurally consisting essentially of the carbon nanotubes agglomerated with at least one of the powdered active carbon and the carbon black; and
   drying the film of the agglomerate,
   wherein the step of producing the carbon nanotubes comprises feeding a carbon starting material containing a catalyst and a carbon source into a chamber and synthesizing the carbon nanotubes in the chamber by pyrolysis of the carbon source,
   wherein the average length of the carbon nanotubes based on electron microscopic observation is at least 1 μm, and
   wherein the volume resistivity of the carbon nanotubes is not more than $2\times10^{-2}$ Ω·cm.

2. The production method according to claim 1, wherein the G/D ratio of the carbon nanotubes is at least 50.

3. The production method according to claim 1, wherein the step of preparing the dispersion comprises adjusting the dispersion such that the content of the carbon nanotubes in the electrode is not more than 10 mass %.

4. The production method according to claim 1, wherein the dispersion does not contain a resin binder.

5. The production method according to claim 1, excluding a step of bonding the electrode to a current collector.

6. The production method according to claim 1, wherein the average aspect ratio of the carbon nanotubes is at least 100.

7. The production method according to claim 1, wherein the carbon nanotubes comprise single-walled carbon nanotubes.

8. The production method according to claim 1, wherein synthesizing the carbon nanotubes comprises heating the carbon source to at least 1,300° C.

9. The production method according to claim 1, wherein the purity of the carbon nanotubes is at least 95%.

10. The production method according to claim 4, wherein the step of filtering comprises suction filtering.

11. The production method according to claim 4, wherein the step of filtering comprises pressure filtering.

12. The production method according to claim 4, further comprising the step of roll pressing the film of the agglomerate.

* * * * *